(12) United States Patent
Nada

(10) Patent No.: US 8,181,626 B2
(45) Date of Patent: May 22, 2012

(54) FUEL INJECTION CONTROL APPARATUS FOR INTERNAL COMBUSTION ENGINE

(75) Inventor: Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 73 days.

(21) Appl. No.: 12/991,525

(22) PCT Filed: Jun. 3, 2009

(86) PCT No.: PCT/JP2009/060151
§ 371 (c)(1),
(2), (4) Date: Nov. 8, 2010

(87) PCT Pub. No.: WO2009/150977
PCT Pub. Date: Dec. 17, 2009

(65) Prior Publication Data
US 2011/0056459 A1 Mar. 10, 2011

(30) Foreign Application Priority Data
Jun. 9, 2008 (JP) .................................. 2008-150684

(51) Int. Cl.
*F02D 41/30* (2006.01)
(52) U.S. Cl. ........................................ 123/299; 123/301
(58) Field of Classification Search .................. 123/299, 123/300, 301, 306, 557; 701/103–105
See application file for complete search history.

(56) References Cited

U.S. PATENT DOCUMENTS

| | | | |
|---|---|---|---|
| 6,450,149 B1 * | 9/2002 | McGee | 123/480 |
| 6,823,834 B2 * | 11/2004 | Benson et al. | 123/299 |
| 7,467,615 B2 * | 12/2008 | Siewert | 123/299 |
| 2007/0079811 A1 * | 4/2007 | Nakane | 123/478 |
| 2008/0114524 A1 * | 5/2008 | Idogawa et al. | 701/103 |
| 2011/0005491 A1 * | 1/2011 | Terada et al. | 123/299 |

FOREIGN PATENT DOCUMENTS

| | | |
|---|---|---|
| JP | 10-141124 A | 5/1998 |
| JP | 11-082139 A | 3/1999 |
| JP | 2000-297683 A | 10/2000 |
| JP | 2001-082151 A | 3/2001 |
| JP | 2002-155791 A | 5/2002 |
| JP | 2002-195084 A | 7/2002 |
| JP | 2005-133576 A | 5/2005 |
| JP | 2005-291181 A | 10/2005 |

* cited by examiner

*Primary Examiner* — Hai Huynh
(74) *Attorney, Agent, or Firm* — Kenyon & Kenyon LLP

(57) ABSTRACT

A systematic fuel injection control technique for compression self-igniting internal combustion engines capable of executing an auxiliary injection prior to a primary injection is provided, with which it is possible to optimize an injection mode for the primary injection and the auxiliary injection. In a common rail diesel engine capable of executing at least a main injection and a pre-injection as an operation of fuel injection from an injector, the pre-injection is executed by being split into a first pre-injection and a second pre-injection. The injection timing and the injection amount of each fuel injection is controlled such that some of the fuel injected in the first pre-injection combusts by self-ignition, and the remainder of the fuel does not combust until fuel is injected in the main injection, but combusts together with the fuel injected in the main injection. Also, the injection timing of each fuel injection is controlled such that the fuel injected in the first pre-injection and flowing along a swirl flow in the cylinder overlaps the fuel injected in the subsequent main injection.

4 Claims, 6 Drawing Sheets

FUEL INJECTION CONTROL APPARATUS FOR INTERNAL COMBUSTION ENGINE

This is a 371 national phase application of PCT/JP2009/060151 filed 3 Jun. 2009, which claims priority to Japanese Patent Application No. 2008-150684 filed 9 Jun. 2008, the contents of which are incorporated herein by reference.

TECHNICAL FIELD

The present invention relates to a fuel injection control apparatus for an internal combustion engine, for which a diesel engine is a typical example. Specifically, the present invention relates to a technique for optimizing an injection mode for a primary injection and an auxiliary injection in a compression self-igniting internal combustion engine that is capable of executing an auxiliary injection (hereinafter also referred to as a "pre-injection") prior to a primary injection (hereinafter also referred to as a "main injection") from a fuel injection valve.

BACKGROUND ART

As is commonly known in the conventional technology, in diesel engines used as automobile engines or the like, fuel injection control can be performed to adjust the timing and amount of fuel injection from a fuel injection valve (hereinafter also referred to as an "injector") in accordance with the engine speed, the amount of accelerator operation, the coolant temperature, the intake air temperature, and the like (see, for example, PTL 1).

Combustion in a diesel engine is accomplished by pre-mixed combustion and diffusion combustion. When fuel injection from a fuel injection valve starts, first, a combustible air-fuel mixture is produced by vaporization and diffusion of fuel (ignition delay period). The combustible air-fuel mixture then self-ignites approximately simultaneously at several places in a combustion chamber, and combustion rapidly progresses (pre-mixed combustion). Furthermore, fuel continues to be injected into the combustion chamber, so that combustion takes place continuously (diffusion combustion). After that, there is non-combusted fuel even after completion of fuel injection, so heat continues to be produced for a while (afterburning period).

In addition, in a diesel engine, as the ignition delay period becomes longer, or as the vaporization of fuel in the ignition delay period becomes more intense, the flame propagation speed after ignition increases. When the flame propagation speed is high, too much fuel combusts at a time, and the pressure inside the cylinder increases sharply, generating vibration or noise. This phenomenon is called "diesel knocking", and often occurs particularly when operating at low loads. Also, in such a situation, the amount of production of nitrogen oxide (hereinafter referred to as "NOx") increases along with a sharp increase in combustion temperature, deteriorating exhaust emissions.

In order to prevent such diesel knocking and reduce the amount of NOx production, various fuel injection control apparatuses have been developed. For example, intermittent injection is commonly performed in which fuel injection from a fuel injection valve is performed intermittently by splitting it into a plurality of injections.

For example, according to PTL 2, the injection timing of a pilot injection, in which fuel is injected prior to a main injection, is set to be earlier by an amount equal to a delay period from the injection timing of pilot injection to the actual ignition timing. As a result, the ignition timing of the fuel injected in the pilot injection can be set substantially the same as the main injection period, thereby reducing the amount of PM (particulate matter) and HC (hydrocarbons) emissions.

CITATION LIST

Patent Literature

[PTL 1] JP 2002-155791A
[PTL 2] JP 2002-195084A

SUMMARY OF INVENTION

Technical Problem

In the case of executing a pre-injection or a pilot injection (as a typical example, the following explanations refer to a pre-injection) prior to a main injection as described above, an ignition delay occurs due to an endothermic reaction when starting such injections, and the length of the ignition delay varies depending on the operating state of the engine and other environmental conditions.

In conventional fuel injection control in diesel engines, the injection timings of the fuel injections that minimize the balance of heat produced by the endothermic reaction, or the intervals between the fuel injections (injection intervals) are not quantified. Accordingly, a technique that always executes the pre-injection and the main injection at optimal timings has not yet been developed. In other words, with the conventional technology, various control parameters (such as fuel injection amount and fuel injection timing) are individually set from the viewpoint of reducing combustion noise, reducing the amount of NOx production, and securing a high engine torque, and suitable settings are determined by trial and error for each type of engine (constructing a suitable fuel injection pattern for a pre-injection and a main injection for each type of engine).

As described above, in the conventional technique for setting a fuel injection pattern for the pre-injection and the main injection, a plurality of combinations of injection timings and intervals exist, and variations in the evaluation of operators who determine suitable settings lead to deviation from the optimal fuel injection pattern, which is directly reflected as variations in fuel injection patterns. For this reason, it is nearly impossible to obtain an optimal fuel injection pattern (optimal solution). In other words, in the conventional technique, because each fuel injection pattern is determined by trial and error, a systematic fuel injection control technique that is common to various engines has not been developed, and therefore there remains a need for optimal fuel injection control.

The present invention has been conceived in view of the above problems, and it is an object of the present invention to provide a systematic fuel injection control technique for a compression self-igniting internal combustion engine capable of executing an auxiliary injection prior to a primary injection, with which it is possible to achieve an optimal injection mode for the primary injection and the auxiliary injection.

Solution to Problem

As a means for solving the problems, the present invention is configured as follows. Specifically, the present invention relates to a fuel injection control apparatus for a compression self-igniting internal combustion engine that is configured to be capable of executing at least a primary injection and an auxiliary injection performed prior to the primary injection as an operation of fuel injection from a fuel injection valve. The auxiliary injection is executed by being split into a plurality of injections, and the fuel injection control apparatus is provided with a fuel injection control unit for controlling an injection timing and an injection amount of each fuel injection such that some of the fuel injected in a first auxiliary injection that is performed prior to a second auxiliary injection combusts by self-ignition, and that a remainder of the fuel does not combust until fuel is injected in the primary injection, but combusts together with the fuel injected in the primary injection but combusts together with the fuel injected in the primary injection, and the injection timing of each fuel injection is set such that the fuel injected in the first auxiliary injection and flowing along a swirl flow in a cylinder overlaps the fuel injected in the subsequent primary injection, and that fuel injected in the second auxiliary injection does not overlap the fuel injected in the subsequent primary injection. It is preferable that the second auxiliary injection is an auxiliary injection for preheating that contributes to preheating in the cylinder.

With the above configuration, the auxiliary injection performed prior to the primary injection is performed by being split into a plurality of injections. The reason for performing such split injection (multiple-injection) for auxiliary injection is as follows. Specifically, when the injection amount per instance in the auxiliary injection increases, the amount of latent heat of vaporization increases, and thus the amount of heat absorption increases. As a result, the reduction rate of ambient temperature in the combustion site increases, causing concern regarding an increase in ignition delay of the fuel injected in the auxiliary injection. Furthermore, because the amount of heat generated after ignition of the fuel injected in the auxiliary injection increases as well, concern arises regarding an increase in reverse torque (torque that acts in a direction opposite to the crankshaft rotation direction) produced by combustion of the fuel injected in the auxiliary injection. Accordingly, in order to minimize such ignition delay and reverse torque, the injection amount per instance in the auxiliary injection is reduced to the minimum level possible, and the required injection amount is secured by executing a plurality of injections.

With this configuration, it is possible to cause some of the fuel injected in the first auxiliary injection to contribute to preheating in the cylinder, and to cause the residual fuel that does not contribute to preheating in the cylinder to contribute to torque of the internal combustion engine. More specifically, some of the fuel injected in the first auxiliary injection is capable of self-ignition, and thus it combusts quickly upon the first auxiliary injection. The temperature within the cylinder increases along with this combustion. And, the amount of heat generated by this combustion can be used to promote combustion of the fuel injected in the second auxiliary injection. In this manner, it is possible to cause some of the fuel injected in the first auxiliary injection to contribute to preheating for better ignition of fuel injected in the second auxiliary injection. When the second auxiliary injection is performed, the fuel injected in the second auxiliary injection combusts quickly, further increasing the cylinder temperature. And, the amount of heat generated by combustion of the fuel can be used to promote combustion of the fuel injected in the primary injection. Thus, ignition of the fuel injected in the primary injection can be well-secured.

When the auxiliary injection is performed by split injection from the viewpoint of minimizing ignition delay and reverse torque as described above, because the injection amount of the second auxiliary injection is limited, there is concern that the preheating function of the second auxiliary injection alone is insufficient. Accordingly, in this configuration, some of the fuel injected in the first auxiliary injection is combusted to contribute to preheating in the cylinder, thereby complementing the preheating function of the second auxiliary injection.

On the other hand, the remainder of the fuel injected in the first auxiliary injection combusts together with the fuel injected in the primary injection, and thereby it is possible to increase the torque of the internal combustion engine by an amount corresponding to the amount of the fuel. Also, by setting the injection timing of the primary injection near the compression top dead center (TDC) of the piston, the occurrence of reverse torque can be avoided. Consequently, it is possible to efficiently secure high torque.

With this configuration, fuel for first auxiliary injection is pre-injected into a site where fuel for the primary injection is to be injected in consideration of a swirl flow in the cylinder. By this overlap injection, the remainder of the fuel injected in the first auxiliary injection combusts together with the fuel injected in the primary injection, and thereby it is possible to increase the torque of the internal combustion engine by an amount corresponding to the amount of the fuel. In addition, because fuel for first auxiliary injection is pre-injected into a site where fuel for the primary injection is to be injected, it is possible to shorten the time required for fuel to diffuse and reach a combustible air-fuel ratio, and as a result, a reduction in the initial combustion speed as well as ignition delay can be suppressed.

In the present invention, it is preferable that a third auxiliary injection is executed prior to the first auxiliary injection, and the injection timing and the injection amount of each fuel injection is controlled such that fuel injected in the third auxiliary injection combusts together with the fuel injected in the primary injection. Here, it is preferable that the injection timing of each fuel injection is set such that the fuel injected in the third auxiliary injection and flowing along a swirl flow in the cylinder overlaps the fuel injected in the subsequent primary injection.

With this configuration, the fuel injected in the third auxiliary injection can produce substantially the same effects as those produced by the remainder of the first auxiliary injection, and therefore the effects produced by the remainder of the first auxiliary injection can be further enhanced. Specifically, most of the fuel injected in the third auxiliary injection is incapable of self-ignition, and thus it hardly contributes to preheating in the cylinder. Accordingly, fuel for third auxiliary injection is pre-injected into a site where fuel for the primary injection is to be injected in consideration of a swirl flow in the cylinder. By this overlap injection, the fuel injected in the third auxiliary injection combusts together with the fuel injected in the primary injection, and thereby it is possible to increase the torque of the internal combustion engine by an amount corresponding to the amount of the fuel. As described above, because not only the remainder of the first auxiliary injection but also the fuel injected in the third auxiliary injection can be combusted together with the fuel injected in the primary injection, the internal combustion engine can be operated at a higher torque. Moreover, the fuel injected in the third auxiliary injection hardly combusts until the piston reaches its compression top dead center (TDC) at which fuel is injected in the primary injection, the occurrence of reverse torque by this combustion can be avoided. In addition, because fuel for third auxiliary injection is pre-injected into a site where fuel for the primary injection is to be injected, it is possible to shorten the time required for fuel to diffuse and reach a combustible air-fuel ratio, and as a result, a reduction in the initial combustion speed as well as ignition delay can be suppressed.

When the auxiliary injection is performed by split injection from the viewpoint of minimizing ignition delay and reverse torque as described above, because the injection amount of the first auxiliary injection is limited, there is concern that the torque increase function of the remainder of the first auxiliary injection alone is insufficient. In view of this, in this configuration, the injection mode for the third auxiliary injection is set to overlap injection as described above, so as to cause the fuel injected in the third auxiliary injection to combust together with the fuel injected in the primary injection, thereby complementing the torque increase function of the first auxiliary injection.

Advantageous Effects of Invention

According to the present invention, it is possible to cause some of the fuel injected in the first auxiliary injection to contribute to preheating in the cylinder, and to cause the residual fuel that does not contribute to preheating in the cylinder to contribute to torque of the internal combustion engine.

MODE FOR CARRYING OUT THE INVENTION

A best mode for carrying out the invention will be described with reference to the accompanying drawings.

Hereinafter, an example will be described in which the present invention is applied to a common rail in-cylinder direct injection multi-cylinder (e.g., inline four-cylinder) diesel engine (compression self-igniting internal combustion engine) mounted in an automobile.

—Engine Configuration—

Figure 1:
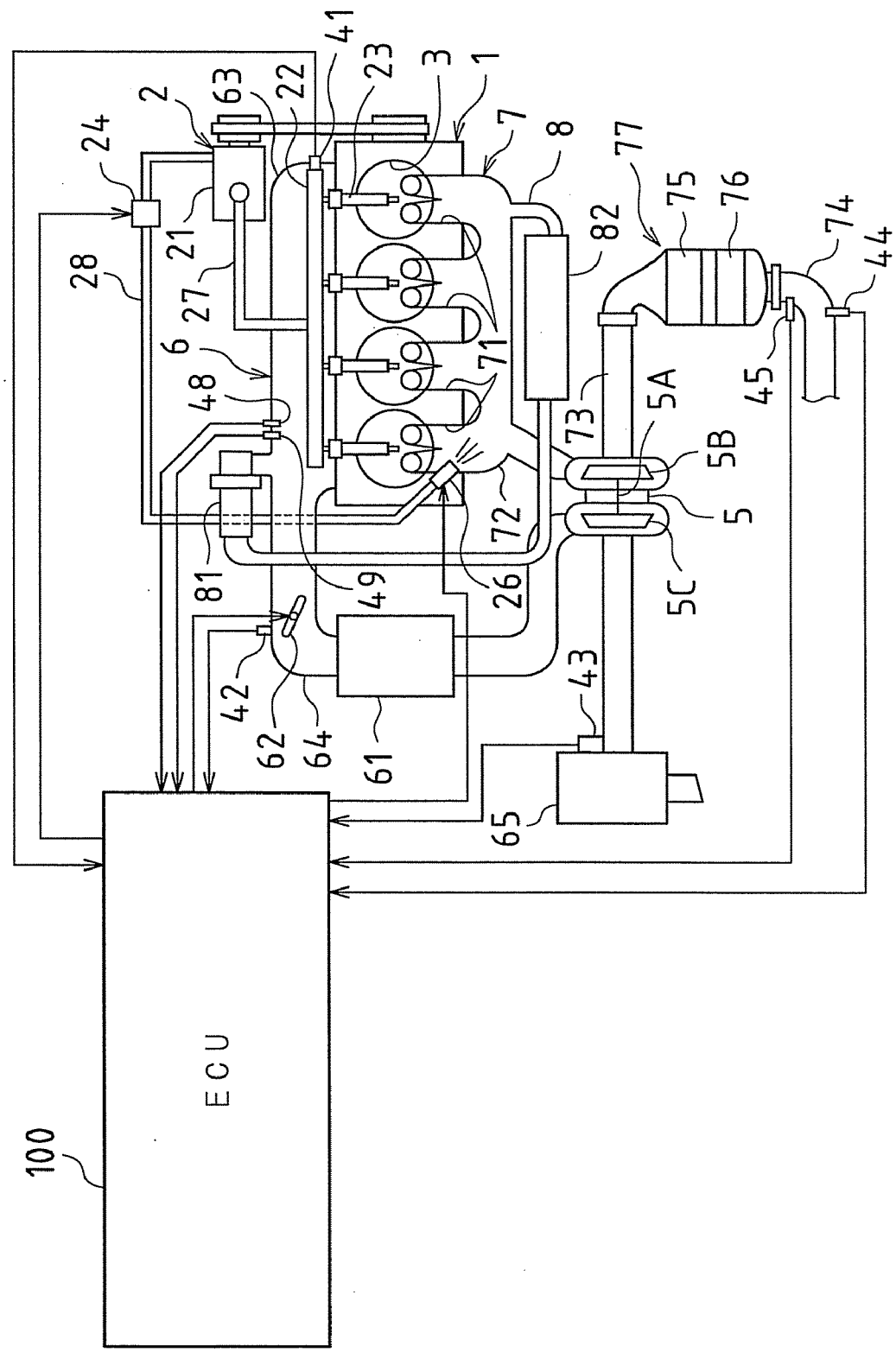
FIG. 1 is a diagram showing an overall configuration of a diesel engine and a control system of the engine according to an embodiment of the present invention.
Figure 2:
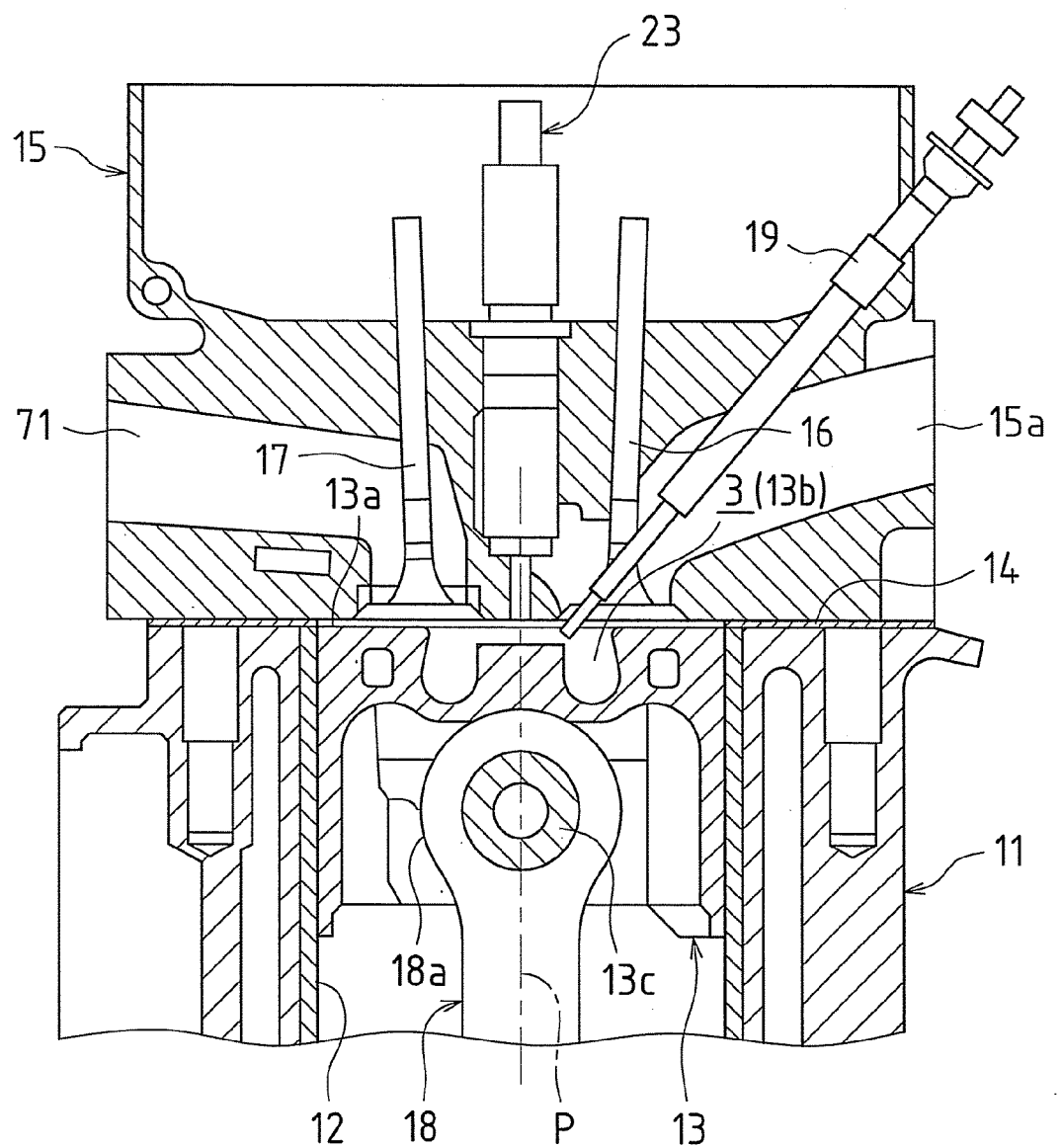
FIG. 2 is a cross-sectional view showing a combustion chamber of the diesel engine and parts in the vicinity of the combustion chamber according to the embodiment of the present invention.

First, an overall configuration of a diesel engine according to an embodiment of the present invention will be described. FIG. 1 is a diagram showing the overall configuration of a diesel engine and a control system of the engine according to the embodiment. FIG. 2 is a cross-sectional view showing a combustion chamber of the diesel engine and parts in the vicinity of the combustion chamber.

As shown in FIG. 1, a diesel engine (hereinafter referred to simply as an "engine") 1 is configured as a diesel engine system including a fuel supply system 2, a combustion chamber 3, an intake system 6, an exhaust system 7, and the like as main units.

The fuel supply system 2 is provided with a supply pump 21, a common rail 22, injectors (fuel injection valves) 23, a cutoff valve 24, a fuel addition valve 26, an engine fuel path 27, and an added fuel path 28, for example.

The supply pump 21 draws fuel from a fuel tank, and after compressing the drawn fuel to high pressure, supplies the fuel to the common rail 22 via the engine fuel path 27. The common rail 22 functions as an accumulation chamber where the high pressure fuel supplied from the supply pump 21 is held (accumulated) at a specific pressure, and this accumulated fuel is distributed to the injectors 23. The injectors 23 are configured from piezo injectors that include a piezoelectric element (piezo element) inside, and that supply fuel by injection into its combustion chamber 3 by appropriately opening a valve. Control of fuel injection from such an injector 23 will be described later in detail.

Also, the supply pump 21 supplies some of the fuel drawn from the fuel tank to the fuel addition valve 26 via the added fuel path 28. In the added fuel path 28, the cutoff valve 24 is provided in order to stop the addition of fuel by cutting off the added fuel path 28 in the event of an emergency.

The fuel addition valve 26 is configured from an electronically controlled opening/closing valve whose valve opening timing is controlled through an addition control operation performed by an ECU 100, which will be described later, such that the amount of fuel added to the exhaust system 7 reaches a target addition amount (an addition amount such that exhaust A/F ratio reaches a target A/F ratio), and such that a fuel addition timing is set to a specific timing. In other words, the fuel addition valve 26 is configured such that a desired amount of fuel is supplied from the fuel addition valve 26 by injection to the exhaust system 7 (from exhaust ports 71 to an exhaust manifold 72) at an appropriate timing.

The intake system 6 is provided with an intake manifold 63 that is connected to an intake port 15a formed in a cylinder head 15 (see FIG. 2), and an intake pipe 64 that constitutes an intake path is connected to the intake manifold 63. Also, in this intake path, an air cleaner 65, an airflow meter 43, and a throttle valve 62 are disposed in this order from the upstream side. The airflow meter 43 outputs an electrical signal according to the amount of air that flows into the intake path via the air cleaner 65.

The exhaust system 7 is provided with the exhaust manifold 72 that is connected to the exhaust ports 71 formed in the cylinder head 15, and exhaust pipes 73 and 74 that constitute an exhaust path are connected to the exhaust manifold 72. Also, in this exhaust path, a maniverter (exhaust purification apparatus) 77 is disposed that is provided with a NOx storage catalyst (NSR catalyst: NOx storage reduction catalyst) 75 and a DPNR catalyst (diesel particulate-NOx reduction catalyst) 76.

The NSR catalyst 75 is a storage reduction NOx catalyst, and is composed of, for example, alumina ($Al_2O_3$) as a support, and an alkali metal such as potassium (K), sodium (Na), lithium (Li), or cesium (Cs), an alkaline earth element such as barium (Ba) or calcium (Ca), a rare earth element such as lanthanum (La) or yttrium (Y), or a precious metal such as platinum (Pt) supported on the alumina support.

The NSR catalyst 75 stores NOx in a state in which a large amount of oxygen is present in exhaust gas, and reduces NOx to $NO_2$ or NO and releases the resulting $NO_2$ or NO in a state in which the oxygen concentration in exhaust gas is low and a large amount of reduction component (e.g., an non-combusted component of fuel (HC)) is present. NOx that has been released as $NO_2$ or NO is further reduced by quickly reacting with HC or CO in exhaust gas and becomes $N_2$. Also, by reducing $NO_2$ or NO, HC and CO themselves are oxidized and thus become $H_2O$ and $CO_2$. In other words, by adjusting the oxygen concentration or the HC component in exhaust gas introduced into the NSR catalyst 75 as appropriate, it is possible to purify HC, CO, and NOx in the exhaust gas. In the configuration of the present embodiment, adjustment of the oxygen concentration or the HC component in exhaust gas can be performed through an operation of adding fuel from the fuel addition valve 26.

The DPNR catalyst 76 is composed of, for example, a porous ceramic structure and a NOx storage reduction catalyst supported on the porous ceramic structure, and PM in exhaust gas is captured when passing through a porous wall. When the air-fuel ratio of the exhaust gas is lean, NOx in the exhaust gas is stored in the NOx storage reduction catalyst, and when the air-fuel ratio is rich, the stored NOx is reduced and released. Furthermore, a catalyst that oxidizes/combusts the captured PM (e.g., an oxidization catalyst whose main component is a precious metal such as platinum) is supported on the DPNR catalyst 76.

A configuration of the combustion chamber 3 of the diesel engine and parts in the vicinity of the combustion chamber 3 will be described now with reference to FIG. 2. As shown in FIG. 2, in a cylinder block 11 that constitutes a part of the engine, a cylindrical cylinder bore 12 is formed in each cylinder (each of four cylinders), and a piston 13 is housed in each cylinder bore 12 so as to be capable of sliding in vertical direction.

A combustion chamber 3 is formed on the top side of a top face 13a of the piston 13. In other words, the combustion chamber 3 is defined by a lower face of the cylinder head 15 installed on top of the cylinder block 11 via a gasket 14, an inner wall face of the cylinder bore 12, and the top face 13a of the piston 13. A cavity 13b is concavely provided in substantially the center of the top face 13a of the piston 13, and this cavity 13b also constitutes a part of the combustion chamber 3.

A small end 18a of a connecting rod 18 is linked to the piston 13 by a piston pin 13c, and a big end of the connecting rod 18 is linked to a crankshaft that is an engine output shaft. Thus, reciprocation movement of the piston 13 within the cylinder bore 12 is transmitted to the crankshaft via the connecting rod 18, and engine output is obtained due to rotation of this crank shaft. Also, a glow plug 19 is disposed facing the combustion chamber 3. The glow plug 19 glows due to electrical current flowing immediately before the engine 1 is started, and functions as a start assistance apparatus whereby ignition and combustion are promoted due to a part of a fuel spray being blown onto the glow plug.

In the cylinder head 15, an intake port 15a that introduces air into the combustion chamber 3 and an exhaust port 71 that discharges exhaust gas from the combustion chamber 3 are formed, and an intake valve 16 that opens/closes the intake port 15a and an exhaust valve 17 that opens/closes the exhaust port 71 are disposed. The intake valve 16 and the exhaust valve 17 are disposed on opposite sides of a cylinder center line P. That is, the engine 1 is configured as a cross flow-type engine. Also, an injector 23 that injects fuel directly into the combustion chamber 3 is installed in the cylinder head 15. The injector 23 is disposed substantially in the center above the combustion chamber 3, in an erect orientation along the cylinder center line P, and injects fuel introduced from the common rail 22 toward the combustion chamber 3 at a specific timing.

Furthermore, as shown in FIG. 1, the engine 1 is provided with a supercharger (turbocharger) 5. The turbocharger 5 is equipped with a turbine wheel 5B and a compressor wheel 5C that are linked via a turbine shaft 5A. The compressor wheel 5C is disposed facing the inside of the intake pipe 64, and the turbine wheel 5B is disposed facing the inside of the exhaust pipe 73. Thus, the turbocharger 5 uses an exhaust flow (exhaust pressure) received by the turbine wheel 5B to rotate the compressor wheel 5C, thereby performing a so-called "supercharging operation" that increases the intake pressure. In this embodiment, the turbocharger 5 is a variable nozzle-type turbocharger, in which a variable nozzle vane mechanism (not shown) is provided on the turbine wheel 5B side, and by adjusting the opening of the variable nozzle vane mechanism, it is possible to adjust the supercharging pressure of the engine 1.

An intercooler 61 for forcibly cooling intake air heated through supercharging by the turbocharger 5 is provided in the intake pipe 64 of the intake system 6. The throttle valve 62 provided on the downstream side from the intercooler 61 is an electronically controlled opening/closing valve whose opening can be adjusted steplessly, and has the function of restricting an intake air flow area under specific conditions and adjusts (reduces) the amount of supply of intake air.

Also, the engine 1 is provided with an exhaust gas recirculation path (EGR path) 8 that connects the intake system 6 and the exhaust system 7. The EGR path 8 decreases the combustion temperature by directing part of the exhaust gas back to the intake system 6 and resupplying that exhaust gas to the combustion chamber 3 as appropriate, thus reducing the amount of NOx production. Also, the EGR path 8 is provided with an EGR valve 81 that is capable of freely adjusting the flow rate of exhaust gas that flows through the EGR path 8 by being opened/closed steplessly under electronic control, and an EGR cooler 82 for cooling exhaust gas that passes through (recirculates through) the EGR path 8.

—Sensors—

Various sensors are installed in the components of the engine 1, and each sensor outputs a signal related to environmental conditions of each component or the operating state of the engine 1.

For example, the airflow meter 43 outputs a detection signal according to the flow rate of intake air (intake air amount) on the upstream side of the throttle valve 62 provided in the intake system 6. An intake temperature sensor 49 is disposed in the intake manifold 63 and outputs a detection signal according to the temperature of intake air. An intake pressure sensor 48 is disposed in the intake manifold 63 and outputs a detection signal according to the pressure of intake air. An A/F (air-fuel ratio) sensor 44 outputs a detection signal that continuously changes according to the oxygen concentration in exhaust gas on the downstream side of the maniverter 77 of the exhaust system 7. Likewise, an exhaust temperature sensor 45 outputs a detection signal according to the temperature of exhaust gas (exhaust temperature) on the downstream side of the maniverter 77 of the exhaust system 7. A rail pressure sensor 41 outputs a detection signal according to the pressure of fuel accumulated in the common rail 22. A throttle opening sensor 42 detects the opening degree of the throttle valve 62.

—ECU—

Figure 3:
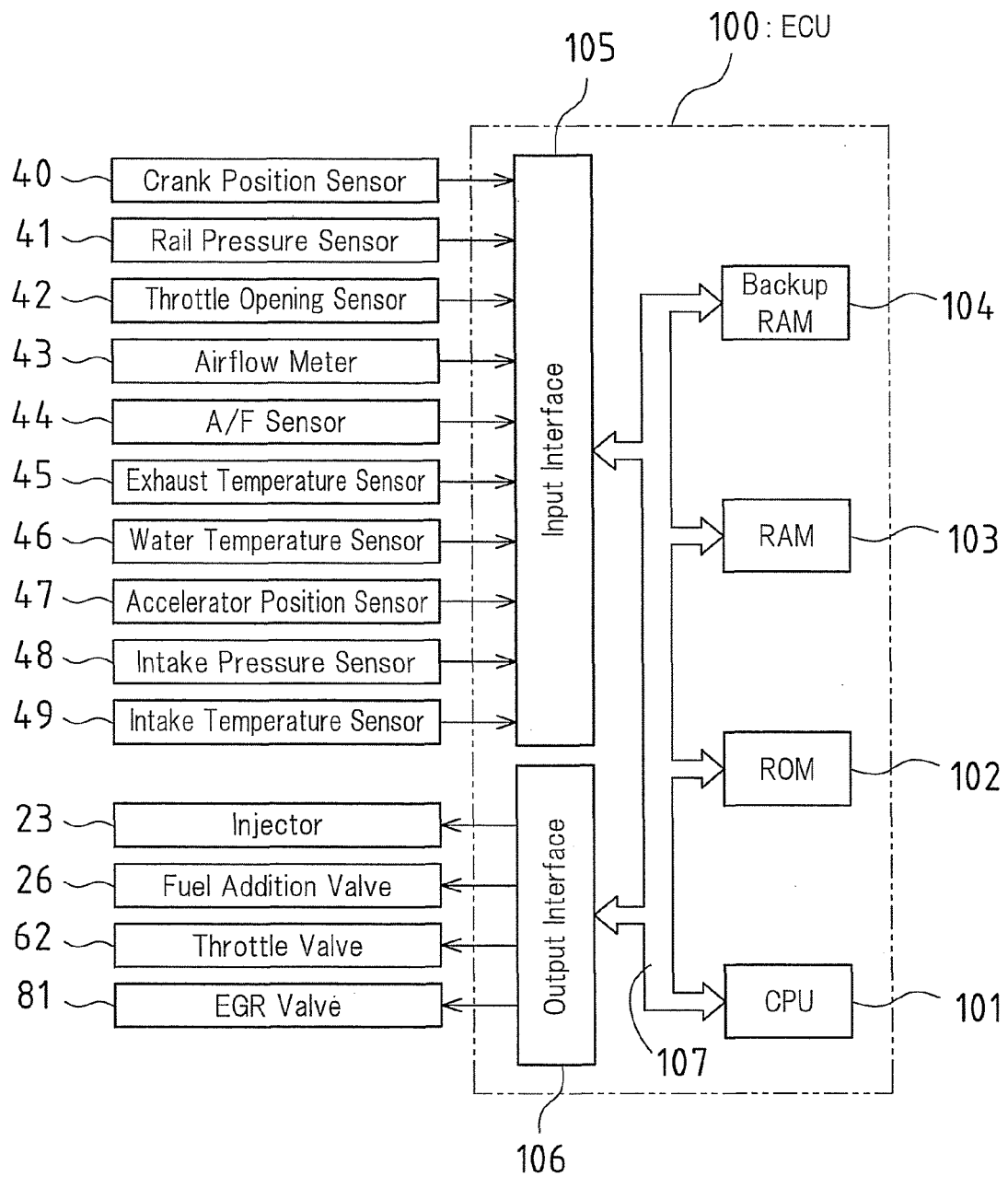
FIG. 3 is a block diagram showing the configuration of a control system such as an ECU according to the embodiment of the present invention.

As shown in FIG. 3, the ECU 100 is provided with a CPU 101, a ROM 102, a RAM 103, a backup RAM 104, and the like. In the ROM 102, various control programs, maps that are referred to when executing those various control programs, and the like are stored. The CPU 101 executes various computational processes based on the various control programs and maps stored in the ROM 102. The RAM 103 is a memory that temporarily stores data obtained as a result of computation performed by the CPU 101, data that has been input from the sensors, and the like, and the backup RAM 104 can be, for example, a nonvolatile memory that stores data to be saved and the like when the engine 1 is stopped.

The CPU 101, the ROM 102, the RAM 103, and the backup RAM 104 are connected to each other via a bus 107, and are connected to an input interface 105 and an output interface 106 via the bus 107.

The input interface 105 is connected to the rail pressure sensor 41, the throttle position sensor 42, the airflow meter 43, the A/F sensor 44, the exhaust temperature sensor 45, the intake pressure sensor 48, and the intake temperature sensor 49. Furthermore, the input interface 105 is connected to a water temperature sensor 46 that outputs a detection signal according to the coolant temperature of the engine 1, an accelerator position sensor 47 that outputs a detection signal according to the amount of accelerator pedal depression, a crank position sensor 40 that outputs a detection signal (pulse) each time the output shaft (crankshaft) of the engine 1 rotates a specific angle, and the like. On the other hand, the output interface 106 is connected to the injector 23, the fuel addition valve 26, the throttle valve 62, the EGR valve 81, and the like.

The ECU 100 controls various operations of the engine 1 based on the output of the above-described sensors. Furthermore, the ECU 100 executes pilot injection, pre-injection, main injection, after-injection, and post-injection, all of which will be described later, as control of fuel injection by the injector 23.

When executing these fuel injections, the fuel injection pressure is determined based on the internal pressure of the common rail 22. As the common rail internal pressure, ordinarily, the target value for the pressure of fuel supplied from the common rail 22 to the injector 23, or in other words, the target rail pressure, is set to be higher as the engine load increases, and as the engine revolution increases. That is, when the engine load is high, because a large amount of air is drawn into the combustion chamber 3, a large amount of fuel needs to be injected from the injector 23 to the combustion chamber. Accordingly, it is necessary to increase the injection pressure of the injector 23. Also, when the engine revolution is high, because the period during which injection is possible is short, it is necessary to inject a large amount of fuel per unit time. Accordingly, it is necessary to increase the injection pressure of the injector 23. In this manner, the target rail pressure is ordinarily set based on the engine load and the engine revolution.

Optimum values for fuel injection parameters of fuel injection such as pilot injection or main injection mentioned above vary according to temperature conditions of the engine, intake air, and the like.

For example, the ECU 100 adjusts the amount of fuel discharged by the supply pump 21 such that the common rail pressure becomes equal to the target rail pressure set based on the operating state of the engine, or in other words, such that the fuel injection pressure matches the target injection pressure. Also, the ECU 100 determines the fuel injection amount and the fuel injection mode based on the operating state of the engine. Specifically, the ECU 100 calculates an engine revolution speed based on the value detected by the crank position sensor 40 and obtains an amount of accelerator pedal depression (accelerator opening degree) based on the value detected by the accelerator opening degree sensor 47, and determines the total fuel injection amount (the sum of the injection amount injected in a pre-injection and the injection amount injected in a main injection, which will be described below) based on the engine revolution speed and the accelerator opening degree.

—Fuel Injection Mode—

An overview of the operation of pilot injection, pre-injection, main injection, after-injection, and post-injection according to the present embodiment will be described next.

(Pilot Injection)

Pilot injection is an injection operation in which a small amount of fuel is injected from the injector 23 prior to a main injection (primary injection). More specifically, it is an operation performed to sufficiently increase the temperature of compressed gas (cylinder temperature) during the period between the time when fuel injection is temporarily interrupted after execution of the pilot injection and the time when a main injection starts, so as to reach the self-ignition temperature of the fuel so that ignition of the fuel injected in the main injection is well-secured. That is, the function of the pilot injection in this embodiment is designed specifically for preheating in a cylinder. In other words, the pilot injection in this embodiment is an injection operation for preheating gas within the combustion chamber 3 (operation to supply fuel for preheating).

Specifically, in order to achieve an appropriate spray distribution and local concentration, the injection amount per instance in the pilot injection is set to a minimum limit injection amount (e.g., 1.5 mm$^3$) of the injector 23, and the number of injections is set such that the necessary total pilot injection amount can be secured. In the case where the pilot injection is performed by split injection as just described, the interval is determined according to the responsiveness (the speed of opening/closing operation) of the injector 23. This interval can be set to 200 μs, for example. Moreover, the injection start timing for the pilot injection can be set to, for example, 80° before compression top dead center (BTDC) of the piston 13 or later in terms of the crank angle. The injection amount per instance, the interval, and the injection start timing of the pilot injection are not limited to the values given above.

(Pre-Injection)

Pre-injection is an injection operation in which a small amount of fuel is injected from the injector 23 prior to a main injection. The pre-injection is an injection operation for suppressing fuel ignition delay in the main injection and leading to stable diffusion combustion, and is also called "auxiliary injection". The pre-injection includes an injection operation for generating torque of the engine 1 (operation to supply fuel for torque generation) and an injection operation for preheating gas within the combustion chamber 3 (operation to supply fuel for preheating). A specific injection mode for the pre-injection of the present embodiment, and the relationship between pre-injection and main injection will be described later.

The injection amount in the pre-injection can be set to a specific ratio (e.g., 10%) relative to the total fuel injection amount (the sum of the injection amount injected in a pre-injection and the injection amount injected in the main injection) for obtaining the required torque determined according to the operating state, such as the engine speed, the amount of accelerator operation, the coolant temperature, and the intake air temperature.

The pre-injection start angle (crank angle position) can be obtained by the following Equation (1). As used herein, "angle" means a value converted to a crankshaft rotation angle.

$$\begin{aligned}\text{Pre-injection start angle} =\ &\text{pre-combustion end angle}+\\ &\text{pre-injection period working angle}+(\text{crank angle}\\ &\text{conversion value of combustion required time in}\\ &\text{pre-injection}+\text{crank angle conversion value of}\\ &\text{ignition delay time}-\text{crank angle conversion value}\\ &\text{of overlap time})\end{aligned} \quad (1)$$

In Equation (1), the ignition delay time is a time difference between the time when a pre-injection is executed and the time when the fuel injected in the pre-injection ignites. The overlap time is, when a plurality of pre-injections are performed, an overlap time of the combustion period of fuel injected in a previously executed pre-injection and the combustion period of fuel injected in a subsequently executed pre-injection (the time during which two combustions are simultaneously being performed), an overlap time of the combustion period of fuel injected in a final pre-injection and the combustion period of fuel injected in a subsequently executed main injection, and an overlap time of the combustion period of fuel injected in a final pilot injection and the combustion period of fuel injected in a pre-injection. The present invention is not limited to Equation (1) given above, and it is also possible to set the pre-injection start angle according to the crank angle conversion value (ignition delay angle) of ignition delay time in the pre-injection and a crank angle conversion value (combustion start angle) of a time required, after elapse of the ignition delay time, from the time when the balance of the amount of heat generated in the cylinder is negative due to the endothermic reaction at the start of the pre-injection until the time when the balance of the produced heat amount becomes positive.

(Main Injection)

Main injection is an injection operation for generating torque of the engine 1 (operation to supply fuel for torque generation). A specific injection mode for the main injection of the present embodiment, and the relationship between pre-injection and main injection will be described later.

The injection amount in the main injection can be set as an amount obtained by subtracting the injection amount in the above-described pre-injection from the above-described total amount of fuel for obtaining the required torque determined according to the operating state, such as the engine speed, the amount of accelerator operation, the coolant temperature, and the intake air temperature.

The main injection start angle (crank angle position) can be obtained by the following Equation (2).

$$\begin{aligned}\text{Main injection start angle} =\ &\text{main ignition timing}+\text{main}\\ &\text{injection period working angle}+(\text{crank angle con-}\\ &\text{version value of combustion required time in}\\ &\text{main injection}+\text{crank angle conversion value of}\\ &\text{ignition delay time}-\text{crank angle conversion value}\\ &\text{of overlap time})\end{aligned} \quad (2)$$

In Equation (2), the ignition delay time is a time difference between the time when a main injection is executed and the time when the fuel injected in the main injection ignites. The overlap time is an overlap time of the combustion period of fuel injected in the pre-injection and the combustion period of fuel injected a main injection, and an overlap time of the combustion period of fuel injected in a main injection and the combustion period of fuel injected in an after-injection. The present invention is not limited to Equation (2) given above, and it is also possible to set the main injection start angle according to the crank angle conversion value (ignition delay angle) of ignition delay time in the main injection.

Here, a control process for the pre-injection and the main injection described above will be briefly described. First, with respect to a torque requirement value of the engine 1, a sum of the injection amount in the pre-injection and the injection amount in the main injection is calculated as the total amount of fuel to be injected. In other words, the total amount of fuel to be injected is calculated as an amount for generating the torque required by the engine 1.

The torque requirement value of the engine 1 is determined according to the operating state, such as the engine speed, the amount of accelerator operation, the coolant temperature, and the intake air temperature, as well as according to the status of use of accessories and the like. For example, the higher the engine speed (engine speed calculated based on the value detected by the crank position sensor 40) or the larger the amount of accelerator operation (the amount of accelerator pedal depression detected by the accelerator position sensor 47) (the greater the accelerator opening), the higher the resulting torque requirement value of the engine 1.

After the total amount of fuel to be injected has been calculated in this manner, a ratio (division ratio) of the injection amount in the pre-injection with respect to the total amount of fuel to be injected is set. In other words, the pre-injection amount is set as an amount obtained by dividing the total amount of fuel to be injected using the above division ratio. In this case, the division ratio (pre-injection amount) is obtained as a value at which suppression of fuel ignition delay in main injection can be achieved. In the present embodiment, the division ratio is set to 10%. With such pre-injection and main injection, it is possible to achieve a reduction in combustion noise and a reduction in the amount of NOx production by realization of slow combustion, while securing high engine torque.

(After-Injection)

After-injection is an injection operation for increasing the exhaust gas temperature. Specifically, in the present embodiment, after-injection is executed at a timing such that most of the combustion energy of fuel supplied by this after-injection is obtained as exhaust heat energy instead of being converted into torque of the engine 1. Also, in this after-injection as well, in the same manner as in the case of the pilot injection described above, the injection amount per instance in the after-injection is set to a minimum limit injection amount (e.g., 1.5 mm$^3$) of the injector 23, and the number of injections is set such that the necessary total after-injection amount can be secured.

(Post-Injection)

Post-injection is an injection operation for increasing the temperature of the maniverter 77 by directly introducing fuel into the exhaust system 7. For example, when the amount of PM captured by and deposited in the DPNR catalyst 76 has exceeded a specific amount, which can be detected through detection of a differential pressure of the maniverter 77 for example, post-injection is executed.

—Target Fuel Pressure Setting Technique—

The technical idea of setting a target fuel pressure in the present embodiment will be described now.

In the diesel engine 1, it is important to simultaneously satisfy demands such as improving exhaust emissions by decreasing the amount of NOx production, reducing combustion noise during a combustion stroke, and securing sufficient engine torque. The present inventors paid attention to the fact that, as a technique for simultaneously satisfying such demands, it is effective to appropriately control the state of change in heat generation within a cylinder during a combustion stroke (state of change expressed by a heat generation waveform), and have found the following target fuel pressure setting technique as a technique for controlling the state of change in heat generation.

Figure 4:
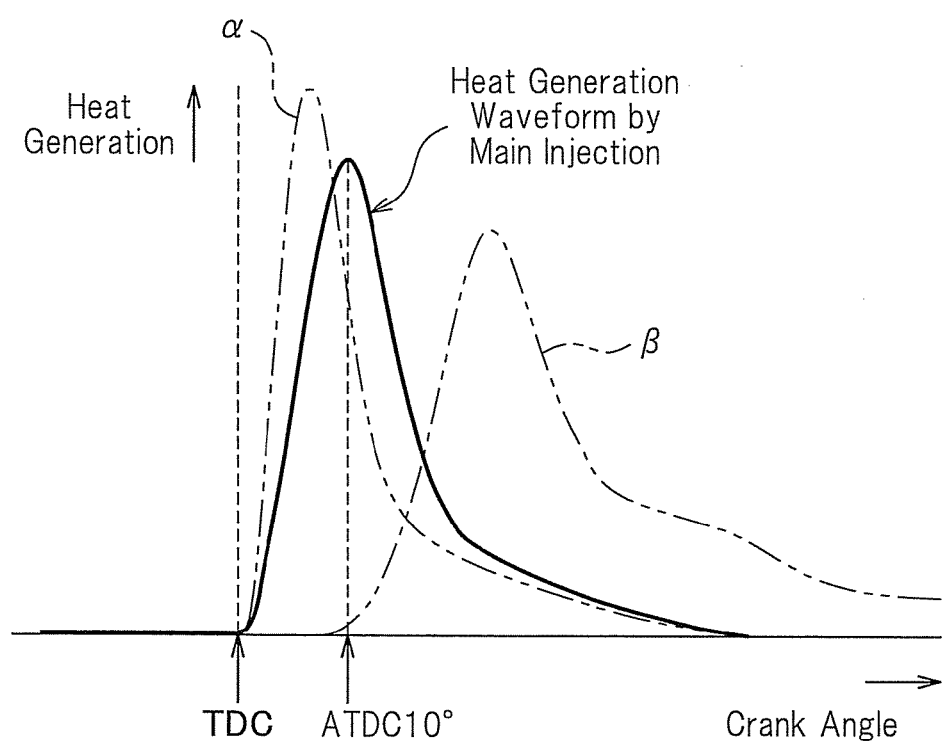
FIG. 4 is a waveform chart showing a state of change in heat generation during an expansion stroke according to the embodiment of the present invention.

The solid line in FIG. 4 indicates an ideal heat generation waveform regarding the combustion of the fuel injected in the main injection, with the horizontal axis representing the crank angle and the vertical axis representing heat generation. In FIG. 4, a heat generation waveform of main injection alone (heat generation waveform to which heat generation in a pre-injection is not added) is shown. TDC shown in FIG. 4 indicates a crank angle position corresponding to the compression top dead center of the piston 13.

In this heat generation waveform, for example, the combustion of the fuel injected in the main injection starts when the piston 13 is at the compression top dead center (TDC), heat generation reaches its maximum value (peak value) at a specific piston position after the compression top dead center (e.g., at 10° after the compression top dead center (10° ATDC)), and the combustion of the fuel injected in the main injection ends at another specific piston position after the compression top dead center (e.g., at 25° after the compression top dead center (25° ATDC)). In order to end the combustion no later than 25° ATDC, in the present embodiment, the injection of fuel in the main injection is ended no later than 22° after the compression top dead center (22° ATDC). Executing the combustion of an air-fuel mixture in this state of change in heat generation creates a situation where the combustion of 50% of the air-fuel mixture present in a cylinder is complete at 10° after the compression top dead center (10° ATDC). In other words, approximately 50% of the total amount of heat generated in an expansion stroke is generated no later than 10° ATDC, and the engine 1 can be operated with high thermal efficiency.

The waveform indicated by a dashed double-dotted line α in FIG. 4 is a heat generation waveform created when the fuel injection pressure is set higher than the appropriate value. The combustion speed and the peak value are both excessively high, and thus there is concern regarding an increase in combustion noise and the amount of NOx production. On the other hand, the waveform indicated by a dashed double-dotted line β in FIG. 4 is a heat generation waveform created when the fuel injection pressure is set lower than the appropriate value. The combustion speed is low and the timing at which the peak appears is significantly shifted toward the angle of delay side, and thus there is concern that sufficient engine torque may not be attained.

As described above, the target fuel pressure setting technique according to the present embodiment is based on a technical idea that combustion efficiency is improved by optimizing the state of change in heat generation (optimizing the heat generation waveform). As the actual fuel injection operation, the pilot injection and pre-injection described above are executed prior to the main injection in which such a heat generation waveform is obtained. In other words, by sufficiently increasing the cylinder temperature by the pilot injection and the pre-injection, ignition of fuel injected in the main injection is well-secured, fuel ignition delay in the main injection is suppressed by the pre-injection, leading to stable diffusion combustion.

—Injection Mode for Pre-Injection and Main Injection—

Next, the injection mode for the pre-injection and the main injection that is a feature of the present embodiment will be described.

First, a function of pre-injection will be described. The fuel injected in the pre-injection generally has a function of contributing to preheating in the cylinder by self-ignition (referred to as a "preheating function") and a function of combusting together with the fuel injected thereafter without self-ignition (fuel injected in the main injection in the present embodiment) (referred to as a "premixing function"). In the fuel injected in the pre-injection, the ratio between fuel that contributes to the preheating function (referred to as a "preheated fraction") and fuel that contributes to the premixing function (referred to as a "pre-mixed fraction") varies according to the timing and amount of the pre-injection. This will be described with reference to FIG. 5.

Figure 5:
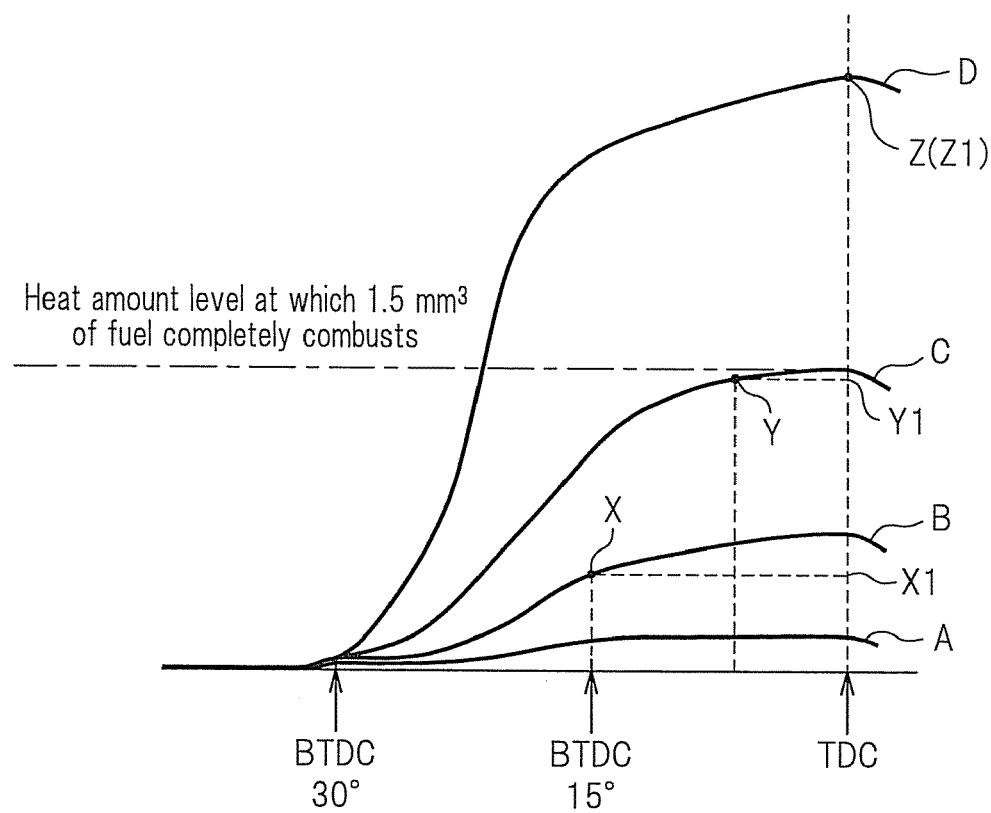
FIG. 5 is a diagram showing results of analyzing the relationship between a pre-injection execution timing and the amount of heat generated in a cylinder at the pre-injection execution timing for a plurality of fuel injection amounts according to the embodiment of the present invention.

FIG. 5 shows results of analyzing the relationship between the pre-injection execution timing and the amount of heat generated in the cylinder at the pre-injection execution timing for a plurality of fuel injection amounts (A to D). For example, A indicates a fuel injection amount of 0.7 mm³, B indicates a fuel injection amount of 1.5 mm³, C indicates a fuel injection amount of 3.0 mm³, and D indicates a fuel injection amount of 6.0 mm³. The dashed single-dotted line in FIG. 5 shows the amount of heat generated when fuel in an amount of 1.5 mm³ is completely combusted. For example, the point X in FIG. 5 indicates that the amount of heat generated when the pre-injection is executed at the timing of 15° before compression top dead center (BTDC) of the piston 13 and the fuel injection amount is set to 1.5 mm³ is X1 [J]. The point Y in FIG. 5 indicates that the amount of heat generated when the pre-injection is executed at the timing of 7° before compression top dead center (BTDC) of the piston 13 and the fuel injection amount is set to 3.0 mm³ is Y1 [J]. Furthermore, the point Z in FIG. 5 indicates that the amount of heat generated when the pre-injection is executed at the timing of the compression top dead center (BTDC) of the piston 13 and the fuel injection amount is set to 6.0 mm³ is Z1 [J].

As can be understood from this diagram, the closer the pre-injection timing approaches the compression top dead center (TDC) of the piston 13, the larger the amount of heat generated even if the amount of fuel injected is the same. In other words, if the pre-injection is executed in an environment in which the piston 13 has come near the compression top dead center and the cylinder temperature has increased, an air-fuel mixture that locally has a high concentration is exposed to a high-temperature environment and combustion starts. Therefore, the closer the pre-injection timing approaches the compression top dead center (TDC) of the piston 13, the larger the heat production amount even when the fuel injection amount is the same. Accordingly, such fuel capable of self-ignition can serve as a preheated fraction described above.

On the other hand, as the pre-injection timing is advanced from the compression top dead center (TDC) of the piston 13, a very small amount of fuel is pre-injected while the interior volume of the combustion chamber is large (while the piston 13 is at a low position). Accordingly, even when the piston 13 thereafter comes near the compression top dead center and the cylinder temperature increases (the increase in temperature due to the compression of intake air), the air-fuel mixture cannot ignite because the fuel has already dispersed in a wide range, and the air-fuel mixture has become leaner than the combustible air-fuel ratio. Accordingly, such fuel incapable of self-ignition can serve as the pre-mixed fraction.

The closer the pre-injection timing approaches the compression top dead center (TDC) of the piston 13, the higher the ratio of preheated fraction. However, even if the pre-injection is executed near the compression top dead center (TDC) of the piston 13, approximately only 50% of the amount of fuel injected (preheated fraction) can actually contribute to the heat production amount. For example, in the case of pre-injection in which 3.0 mm³ of fuel is injected at the timing of the compression top dead center (TDC) of the piston 13, the heat production amount corresponds to a heat amount level obtained when 1.5 mm³ of fuel has completely combusted.

In contrast, as the pre-injection timing is advanced from the compression top dead center (TDC) of the piston 13, the ratio of pre-mixed fraction increases. As can be understood from FIG. 5, the air-fuel mixture rapidly becomes lean when the pre-injection is executed at a timing that is on the angle of advance side of 18° before compression top dead center (BTDC) of the piston 13, and the ratio of pre-mixed fraction further increases. Also, when the pre-injection is executed at a timing that is on the angle of advance side of 30° before compression top dead center (BTDC) of the piston 13, if the injection amount is a specific upper limit value or less, all of the fuel injected in the pre-injection can serve as a pre-mixed fraction. Conversely, when the pre-injection is executed at a timing that is on the angle of delay side of 30° before compression top dead center (BTDC) of the piston 13, some of the fuel injected in the pre-injection serves as a preheated fraction, and the remainder serves as a pre-mixed fraction.

A feature of the present embodiment will be described next. In the present embodiment, the pre-injection performed prior to the main injection is performed by being split into a plurality of injections. The reason for performing pre-injection by split injection (multiple injection) is as follows. Specifically, when the injection amount per instance in the pre-injection increases, the amount of latent heat of vaporization increases, and thus the amount of heat absorption increases. As a result, the reduction rate of ambient temperature in the combustion site increases, causing concern regarding an increase in ignition delay of the fuel injected in the pre-injection. Furthermore, because the amount of heat generated after ignition of the fuel injected in the pre-injection increases as well, concern arises regarding an increase in reverse torque produced by combustion of the fuel injected in the pre-injection. Accordingly, in order to minimize such ignition delay and reverse torque, the injection amount per instance in the pre-injection is reduced to the minimum level possible, and the required injection amount is secured by performing a plurality of injections. Hereinafter, an example will be described in which the pre-injection is performed by two injections. A previously executed pre-injection is referred to as a "first pre-injection" and a subsequently executed pre-injection is referred to as a "second pre-injection".

A feature of the present embodiment is that the ignition timing and the injection amount of the pre-injection and the main injection are controlled such that some of the fuel injected in a first pre-injection (preheated fraction) combusts by self-ignition, and that a remainder of the fuel injected in the first pre-injection (pre-mixed fraction) does not combust until fuel is injected in the main injection, but combusts together with the fuel injected in the main injection (operation for controlling fuel injection timings and injection amounts by the fuel injection control unit). In other words, the injection mode for the pre-injection and the main injection is configured such that some of the fuel injected in the first pre-injection contributes to preheating in the cylinder through self-ignition and the remainder of the fuel injected in the first pre-injection contributes to torque of the engine 1 through combustion together with the fuel injected in the main injection. In other words, the fuel injected in the first pre-injection serves both a preheating function and a premixing function. The fuel injected in the second pre-injection primarily serves a preheating function.

As described above, the sum of the injection amount of the first pre-injection and the injection amount of the second pre-injection is set to 10% with respect to the total fuel injection amount for obtaining the required torque. The injection amount of the first pre-injection and the injection amount of the second pre-injection may be equal, or the injection amount of the first pre-injection and the injection amount of the second pre-injection may be different and have different appropriate ratios. However, the injection amount of the first pre-injection and the injection amount of the second pre-injection are set to a minimum limit injection amount of the injector 23 or more.

The injection timing of each fuel injection will be described next.

First, the injection timing of the first pre-injection and that of the main injection are set such that a remainder of the fuel injected in the first pre-injection (pre-mixed fraction) does not combust until fuel is injected in the main injection but combusts together with the fuel injected in the main injection. In other words, the injection timings of the first pre-injection and the main injection are set such that the fuel supplied in the first pre-injection as a pre-mixed fraction combusts together with the fuel supplied in the subsequent main injection.

Specifically, the injection timing of the first pre-injection and that of the main injection are set such that the fuel injected in the first pre-injection and flowing along a swirl flow within the cylinder overlaps the fuel injected in the subsequent main injection. In other words, fuel for the first pre-injection is pre-injected into a site where fuel for the main injection is to be injected in consideration of a swirl flow in the cylinder. Such an injection mode for the first pre-injection and the main injection is referred to as an "overlap injection".

To describe it more specifically, the flow of air flowing into the cylinder from the intake port 15a during the suction stroke of the engine 1 is a swirl flow whose center of rotation is the cylinder center line P described above, and this swirl flow occurs continuously in the cylinder during the compression stroke. For this reason, the fuel injected in the first pre-injection flows in a circumferential direction in the cylinder due to this swirl flow. In other words, as time elapses during the compression stroke, the fuel (a cloud of spray) injected in the first pre-injection flows in a circumferential direction along the swirl flow from a position facing an injection hole of the injector 23 (a position immediately after injection).

Accordingly, at the point in time when the main injection is executed after the first pre-injection, the fuel injected in the previously executed first pre-injection is already flowing in the circumferential direction in the cylinder, and the clouds of fuel injected from the same injection hole in the two injections (the pre-injection and the main injection) do not overlap each other (i.e., the clouds of fuel injected in the two injections do not merge).

In this case, the fuel injected in the pre-injection from the injection hole on the upstream side in the swirl flow direction flows toward a position on the downstream side in the swirl flow direction that is opposite to the injection hole, and therefore by adjusting the injection timing of the subsequent main injection, or in other words, by adjusting the interval between the pre-injection and main injection, it is possible to cause the fuel injected in the pre-injection and the fuel injected in the main injection to merge.

More specifically, a case is considered in which the swirl flow rotates once in the circumferential direction in the cylinder during the time when the piston 13 moves from the bottom dead center to the top dead center (when the piston 13 moves 180° in terms of the crank angle), or in other words, the swirl ratio is "2". Here, the number of injection holes of the injector 23 is assumed to be "10". In this case, if the interval between the first pre-injection and the main injection is set to an integral multiple of 36° in the circumferential direction in the cylinder (18° in terms of the crank angle), it is possible to merge the fuel injected in the first pre-injection and the fuel injected in the main injection.

Figure 6:
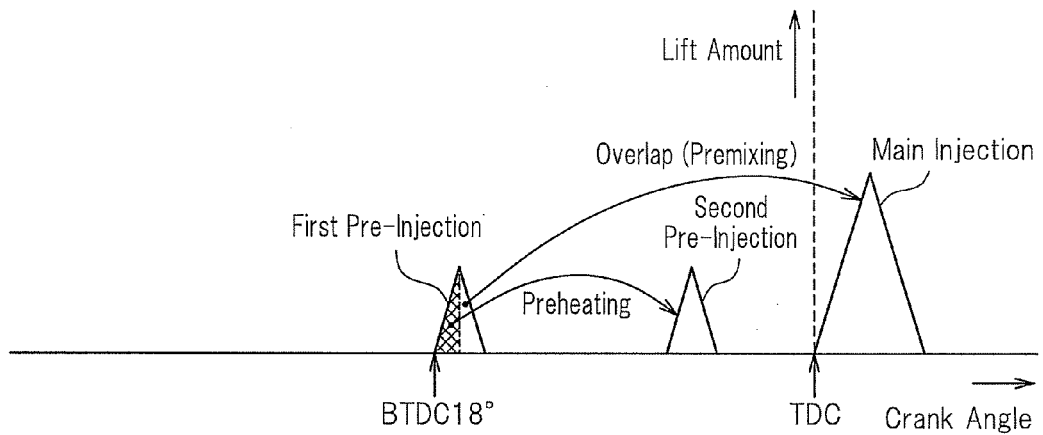
FIG. 6 is a diagram showing a fuel injection pattern of a pre-injection and a main injection according to the embodiment of the present invention.

In the present embodiment, the injection pattern of overlap injection between the first pre-injection and the main injection is as shown in FIG. 6, for example. As shown in FIG. 6, the injection timing of the first pre-injection is set to 18° before compression top dead center (BTDC) of the piston 13, and the injection timing of the main injection is set at the compression top dead center (TDC) of the piston 13. Accordingly, the interval between the first pre-injection and the main injection is set to 18° in terms of the crank angle.

The interval between the first pre-injection and the main injection can be set to 36° in terms of the crank angle if only overlap injection is considered, but the interval is preferably set to 18° in terms of the crank angle for the following reasons. First, as described above, when the pre-injection is performed by split injection from the viewpoint of minimizing ignition delay and reverse torque, because the injection amount of the first pre-injection is limited, when the first pre-injection is executed at a timing that is on the angle of advance side of 30° before compression top dead center (BTDC) of the piston 13, the amount of fuel that can serve as a preheated fraction may be extremely small (see FIG. 5). Also, when the first pre-injection is executed at a timing that is on the angle of advance side of 30° before compression top dead center (BTDC) of the piston 13, because there is a possibility that the fuel injected in the first pre-injection might reach the inner wall face of the cylinder, problems may occur such as lubricant dilution due to the fuel that has reached the inner wall face of the cylinder, or the amount of HC or CO in the exhaust gas may increase due to the fuel that has attached to the inner wall face of the cylinder, deteriorating exhaust emissions.

Next, the injection timing of the second pre-injection and that of the main injection are set such that the fuel injected in the second pre-injection and flowing along a swirl flow within the cylinder does not overlap the fuel injected in the subsequent main injection. In other words, fuel for the second pre-injection is pre-injected into a site other than the site where fuel for the main injection is to be injected in consideration of the swirl flow in the cylinder. Such an injection mode for the second pre-injection and main injection is referred to as a "contiguous injection".

More specifically, when the swirl ratio is "2", and the number of injection holes of the injector 23 is "10", by setting the interval between the second pre-injection and the main injection to be less than 36° in the circumferential direction in the cylinder (18° in terms of the crank angle), it is possible to prevent the fuel injected in the second pre-injection and the fuel injected in the main injection from overlapping. In this case, the timing at which the rate of heat production due to combustion of the fuel injected in the second pre-injection is maximum is preferably set to be substantially the same as the timing at which the piston 13 reaches the compression top dead center. By doing so, the fuel injected in the second pre-injection can be fully utilized, and thereby a necessary and sufficient amount of heat generation can be secured. In addition, it is possible to produce almost no reverse torque by the second pre-injection.

In the present embodiment, the injection pattern of contiguous injection of the second pre-injection and the main injection is as shown in FIG. 6, for example. As shown in FIG. 6, the injection timing of the second pre-injection is set to be less than 18° before compression top dead center (BTDC) of the piston 13 (e.g., 7°), and the injection timing of the main injection is set at the compression top dead center (TDC) of the piston 13. Accordingly, the interval between the second pre-injection and the main injection is set to be less than 18° in terms of the crank angle.

Also, the injection timing of the first pre-injection and that of the second pre-injection are set such that the fuel injected in the first pre-injection and flowing along a swirl flow within the cylinder does not overlap the fuel injected in the subsequent second pre-injection. In other words, fuel for the first pre-injection is pre-injected into a site other than the site where fuel for the second pre-injection is to be injected in consideration of the swirl flow in the cylinder.

With the fuel injection control of the present embodiment, the following effects can be obtained. Specifically, it is possible to cause some of the fuel injected in the first pre-injection (preheated fraction) to contribute to preheating in the cylinder and to cause the residual fuel that does not contribute to preheating in the cylinder (pre-mixed fraction) to contribute to torque of the engine 1.

More specifically, the preheated fraction of the first pre-injection is capable of self-ignition, and it combusts quickly upon the first pre-injection. When the preheated fraction of the first pre-injection combusts, the temperature of compressed gas in the site of the cylinder where the combustion took place increases locally, increasing the cylinder pressure. This increases the cylinder temperature to reach the self-ignition temperature of fuel. In other words, the amount of heat generated by this combustion can be used to promote combustion of the fuel injected in the second pre-injection. In this manner, it is possible to cause some of the fuel injected in the first pre-injection to contribute to preheating for better ignition of fuel injected in the second pre-injection.

When the second pre-injection is performed, the fuel injected in the second pre-injection combusts quickly, and the cylinder temperature further increases. In this case, because the fuel injected in the second pre-injection and the fuel injected in the main injection are prevented from overlapping, it is possible to cause the fuel injected in the second pre-injection to contribute to preheating in the cylinder. And, the amount of heat generated by combustion of this fuel can be used to promote combustion of the fuel injected in the main injection. Thus, ignition of the fuel injected in the main injection can be well-secured.

When the auxiliary injection is performed by split injection from the viewpoint of minimizing ignition delay and reverse torque as described above, because the injection amount of the second pre-injection is limited, there is concern that the preheating function of the second pre-injection alone is insufficient. Accordingly, in the present embodiment, some of the fuel injected in the first pre-injection is combusted to contribute to preheating in the cylinder, thereby complementing the preheating function of the second pre-injection. In other words, a deficiency of the injection amount of the second pre-injection is complemented by some of the fuel injected in the first pre-injection.

On the other hand, of the fuel injected in the first pre-injection, the residual fuel that does not contribute to preheating in the cylinder (pre-mixed fraction) is incapable of self-ignition, unlike the preheated fraction. In other words, the pre-mixed gas of the pre-mixed fraction of the first pre-injection is leaner than the combustible air-fuel ratio until fuel is injected in the main injection, and thus it cannot ignite. The present embodiment is configured such that the fuel injected in the main injection overlaps the pre-mixed gas of the pre-mixed fraction of the first pre-injection. By this overlap injection, the pre-mixed gas obtains a combustible air-fuel ratio, and combusts quickly together with the fuel injected in the main injection, contributing to torque of the engine 1.

As described above, by utilizing the ignition disability of the pre-mixed fraction of the first pre-injection, the engine 1 can be operated at high torque. In other words, this combustion enables the pre-mixed fraction of the first pre-injection to contributed to torque of the engine 1, and the torque can be increased by an amount corresponding to the amount of the pre-mixed fraction of the first pre-injection that has combusted. At this time, by causing all of the pre-mixed fraction of the first pre-injection to contribute to torque of the engine 1, it is possible to secure a sufficient amount of torque produced by the combustion, and the engine 1 can be operated with high efficiency. Moreover, because the pre-mixed fraction of the first pre-injection does not combust until the piston 13 reaches the compression top dead center (TDC) at which fuel is injected in the main injection, the pre-mixed fraction can prevent the occurrence of reverse torque produced by combustion. In addition, because fuel for the first pre-injection is pre-injected into a site where fuel for the main injection is to be injected by the overlap injection, it is possible to shorten the time required for fuel to diffuse and reach the combustible air-fuel ratio, and as a result, a reduction in the initial combustion speed as well as ignition delay can be suppressed.

Other Embodiments

The embodiment of the present invention has been described above, but the embodiment can be modified in various ways.

The swirl ratio of the engine 1 and the number of injection holes of the injector 23 described above are merely an example, and they can be changed as appropriate. The interval of overlap injection between the pre-injection and the main injection is changed as well when the swirl ratio of the engine 1 and the number of injection holes of the injector 23 are changed.

In the above embodiment, the injection timing of the main injection is set at the compression top dead center (TDC) of the piston 13, but the injection timing of the main injection can be changed as appropriate. The injection timings of the first pre-injection and the second pre-injection are changed as well when the injection timing of the main injection is changed. It is preferable that the injection timing of the main injection is set near the compression top dead center (TDC) of the piston 13 from the viewpoint of suppressing the occurrence of reverse torque.

In the above embodiment, the pre-injection is performed by two injections, but it is also possible to employ a configuration in which the pre-injection is performed by three injections. The injection mode for the pre-injection and the main injection when the pre-injection is split into three injections will be described with reference to FIG. 7. The first pre-injection and the second pre-injection are the same as those of the embodiment described above, and thus differences from the above embodiment will be mainly described. A pre-injection performed prior to the first pre-injection is referred to as a "third pre-injection".

First, the sum of the injection amount of the first pre-injection, the injection amount of the second pre-injection and the injection amount of the third pre-injection is set to 10% with respect to the total fuel injection amount for obtaining the required torque. The injection amount of the first pre-injection, the injection amount of the second pre-injection and the injection amount of the third pre-injection may be equal, or the injection amount of the first pre-injection, the injection amount of the second pre-injection and the injection amount of the third pre-injection may be different and have different appropriate ratios. However, the injection amount of the first pre-injection, the injection amount of the second pre-injection and the injection amount of the third pre-injection are set to a minimum limit injection amount of the injector 23 or more.

Next, the injection timing of the third pre-injection and that of the main injection are set such that the fuel injected in the third pre-injection combusts together with the fuel injected in the main injection. Specifically, the injection timing of the third pre-injection and that of the main injection are set such that the fuel injected in the third pre-injection and flowing along a swirl flow in the cylinder overlaps the fuel injected in the subsequent main injection. In other words, the injection mode for the third pre-injection and the main injection is overlap injection.

Figure 7:
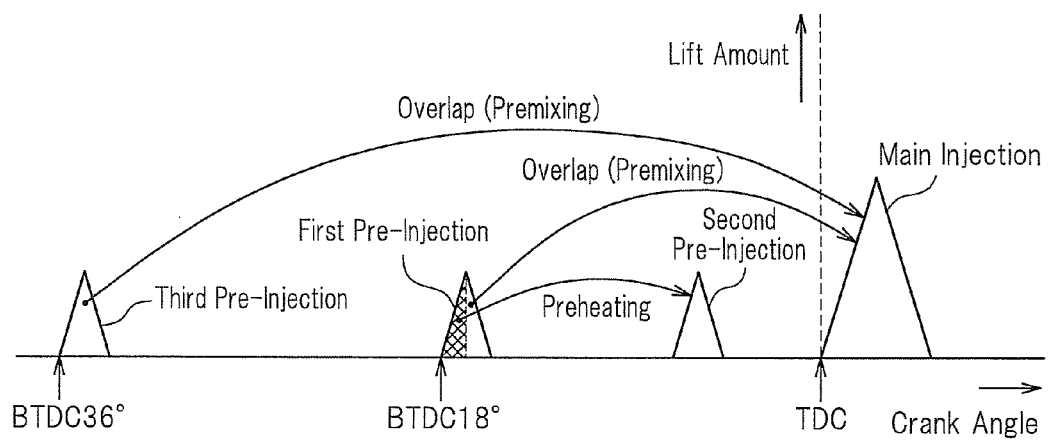
FIG. 7 is a diagram showing a fuel injection pattern of a pre-injection and a main injection according to another embodiment of the present invention.

When the swirl ratio is "2", and the number of injection holes of the injector 23 is "10", the interval between the third pre-injection and the main injection is set to an integral multiple of 36° in the circumferential direction in the cylinder (18° in terms of the crank angle). In the present embodiment, the injection pattern of overlap injection between third pre-injection and main injection is as shown in FIG. 7, for example. As shown in FIG. 7, the injection timing of the third pre-injection is set to 36° before compression top dead center (BTDC) of the piston 13, and the injection timing of the main injection is set at the compression top dead center (TDC) of the piston 13. Accordingly, the interval between the third pre-injection and the main injection is set to 36° in terms of the crank angle. The interval between the third pre-injection and the main injection can be set to 18° in terms of the crank angle if only overlap injection is considered, but because the first pre-injection is performed at this timing, the interval is set to 36° in terms of the crank angle. When the third pre-injection is performed at a timing that is on the angle of advance side of 30° before compression top dead center (BTDC) of the piston 13, because the amount of fuel that contributes to preheating in the cylinder will be extremely small (see FIG. 5), the interval is preferably set to 36° in terms of the crank angle.

The injection timings of the third pre-injection and the first pre-injection are set such that the fuel injected in the third pre-injection and flowing along a swirl flow in the cylinder does not overlap the fuel injected in the subsequent first pre-injection. In other words, the injection mode for the third pre-injection and the first pre-injection is overlap injection. Accordingly, in the example shown in FIG. 7, the interval between the third pre-injection and the first pre-injection is set to 18° in terms of the crank angle. On the other hand, the injection timings of the third pre-injection and the second pre-injection are set such that the fuel injected in the third pre-injection and flowing along a swirl flow in the cylinder does not overlap the fuel injected in the subsequent second pre-injection.

With the fuel injection control of the present embodiment, the following effects can be obtained as well in addition to the same effects as those of the above-described embodiment.

The fuel injected in the third pre-injection can bring about substantially the same effects as those produced by the pre-mixed fraction of the first pre-injection, and therefore the effects produced by the pre-mixed fraction of the first pre-injection can be further enhanced. In other words, the fuel injected in the third pre-injection primarily serves a premixing function.

Specifically, most of the fuel injected in the third pre-injection is incapable of self-ignition, and thus it hardly contributes to preheating in the cylinder. In other words, most of the mixed gas of the third pre-injection is leaner than the combustible air-fuel ratio until fuel is injected in the main injection, and thus it cannot ignite. The present embodiment is configured such that the fuel injected in the main injection overlaps the mixed gas of the third pre-injection. By this overlap injection, the mixed gas obtains a combustible air-fuel ratio, and combusts quickly together with the fuel injected in the main injection, contributing to torque of the engine 1.

As described above, because not only the pre-mixed fraction of the first pre-injection but also the fuel injected in the third pre-injection can be combusted together with the fuel injected in the main injection, the engine 1 can be operated at high torque. At this time, torque can be increased by an amount corresponding to the amount of the fuel injected in the third pre-injection that has combusted. Moreover, because the fuel injected in the third pre-injection hardly combusts until the piston 13 reaches the compression top dead center (TDC) at which fuel is injected in the main injection, it is possible to avoid the occurrence of reverse torque produced by the combustion. In addition, because fuel for the third pre-injection is pre-injected into a site where fuel for the main injection is to be injected by the overlap injection, it is possible to shorten the time required for fuel to diffuse and reach the combustible air-fuel ratio, and as a result, a reduction in the initial combustion speed as well as ignition delay can be suppressed.

As described above, when the pre-injection is performed by split injection from the viewpoint of minimizing ignition delay and reverse torque, because the injection amount of the first pre-injection is limited, there is concern that the premixing function of the pre-mixed fraction of the first pre-injection alone is insufficient when operating at intermediate and high loads. In view of this, in the present embodiment, by performing overlap injection as the injection mode for the third pre-injection, the fuel injected in the third pre-injection can be combusted together with the fuel injected in the main injection, thereby complementing the premixing function of the first pre-injection. In other words, a deficiency of the injection amount of the first pre-injection is complemented by the third pre-injection.

The above embodiments described an example in which the present invention is applied to an in-line four-cylinder diesel engine mounted in an automobile. The present invention is not limited to such an automobile use, and is applicable to engines used in other applications. Also, there is no particular limitation on the number of cylinders, the type of engine (classified as an in-line engine, V-type engine, and so forth), and the like.

The present invention may be embodied in various other forms without departing from the gist or essential characteristics thereof. Therefore, the embodiments described above are to be considered in all respects as illustrative and not limiting. The scope of the invention is indicated by the appended claims rather than by the foregoing description, and all modifications or changes that come within the meaning and range of equivalency of the claims are intended to be embraced therein.

INDUSTRIAL APPLICABILITY

The application of the present invention is not limited to automobiles, and the present invention is also applicable to engines used in other applications.

EXPLANATION OF REFERENCE

1 Engine (Internal Combustion Engine)
12 Cylinder Bore
13 Piston
23 Injector (Fuel Injection Valve)

The invention claimed is:

1. A fuel injection control apparatus for a compression self-igniting internal combustion engine that is capable of executing at least a primary injection and an auxiliary injection performed prior to the primary injection as an operation of fuel injection from a fuel injection valve,
   wherein the auxiliary injection is executed by being split into a plurality of injections,
   the fuel injection control apparatus comprises a fuel injection control unit for controlling an injection timing and an injection amount of each fuel injection such that some of the fuel injected in a first auxiliary injection that is performed prior to a second auxiliary injection combusts by self-ignition, and that a remainder of the fuel does not combust until fuel is injected in the primary injection, but combusts together with the fuel injected in the primary injection, and
   the injection timing of each fuel injection is set such that the fuel injected in the first auxiliary injection and flowing along a swirl flow in a cylinder overlaps the fuel injected in the subsequent primary injection, and that fuel injected in the second auxiliary injection does not overlap the fuel injected in the subsequent primary injection.

2. The fuel injection control apparatus for an internal combustion engine according to claim 1,
   wherein the second auxiliary injection is an auxiliary injection for preheating that contributes to preheating in the cylinder.

3. The fuel injection control apparatus for an internal combustion engine according to claim 1,
   wherein the third auxiliary injection is executed prior to the first auxiliary injection, and
   the injection timing and the injection amount of each fuel injection is controlled such that fuel injected in the third auxiliary injection combusts together with the fuel injected in the primary injection.

4. The fuel injection control apparatus for an internal combustion engine according to claim 3,
   wherein the injection timing and the injection amount is set of such that the fuel injected in the third auxiliary injection and flowing along a swirl flow in the cylinder overlaps the fuel injected in the subsequent primary injection.

* * * * *